United States Patent
Mellings et al.

(10) Patent No.: US 11,654,874 B2
(45) Date of Patent: May 23, 2023

(54) BRAKING SYSTEM

(71) Applicant: Haldex Brake Products AB, Landskrona (SE)

(72) Inventors: Carl Mellings, Lindley (GB); Andreas Jahnke, Landskrona (SE)

(73) Assignee: Haldex Brake Products AB, Landskrona (SE)

( * ) Notice: Subject to any disclaimer, the term of this patent is extended or adjusted under 35 U.S.C. 154(b) by 446 days.

(21) Appl. No.: 16/641,633

(22) PCT Filed: Jun. 1, 2018

(86) PCT No.: PCT/EP2018/064448
§ 371 (c)(1),
(2) Date: Feb. 24, 2020

(87) PCT Pub. No.: WO2019/037912
PCT Pub. Date: Feb. 28, 2019

(65) Prior Publication Data
US 2021/0162965 A1 Jun. 3, 2021

(30) Foreign Application Priority Data
Aug. 25, 2017 (GB) .................... 1713729

(51) Int. Cl.
*B60T 8/17* (2006.01)
*B60Q 5/00* (2006.01)
(Continued)

(52) U.S. Cl.
CPC .......... *B60T 8/17554* (2013.01); *B60Q 5/005* (2013.01); *B60Q 9/00* (2013.01);
(Continued)

(58) Field of Classification Search
CPC ............. B60T 2240/00; B60T 2250/00; B60T 2250/02; B60T 2250/03; B60T 7/12; B60T 8/1708; B60T 8/171; B60T 8/1755; B60T 8/17554; B60T 8/18; B60T 8/1843; B60T 8/1887; H04L 67/12; G07C 5/008; G06Q 10/06315; G06Q 10/083; G06Q 50/28;
(Continued)

(56) References Cited

U.S. PATENT DOCUMENTS

| 4,042,135 A | 8/1977 | Pugh et al. |
| 5,015,145 A | 5/1991 | Angell et al. |

(Continued)

FOREIGN PATENT DOCUMENTS

| DE | 19522632 A1 | 1/1997 |
| EP | 0684150 A1 | 11/1995 |

(Continued)

*Primary Examiner* — Tyler J Lee
(74) *Attorney, Agent, or Firm* — Stoel Rives LLP

(57) ABSTRACT

A vehicle control system comprising an electronic processor, the processor comprising an input port for receiving data from a loading apparatus concerning at least one of the weight, dimensions, volume, or location of a load placed or to be placed by the loading equipment into or onto an associated vehicle in which the vehicle control system is fitted, and is programmed to use the data received from the loading apparatus to make control adjustments such that the associated vehicle maintains stability.

41 Claims, 3 Drawing Sheets

Figure 1:
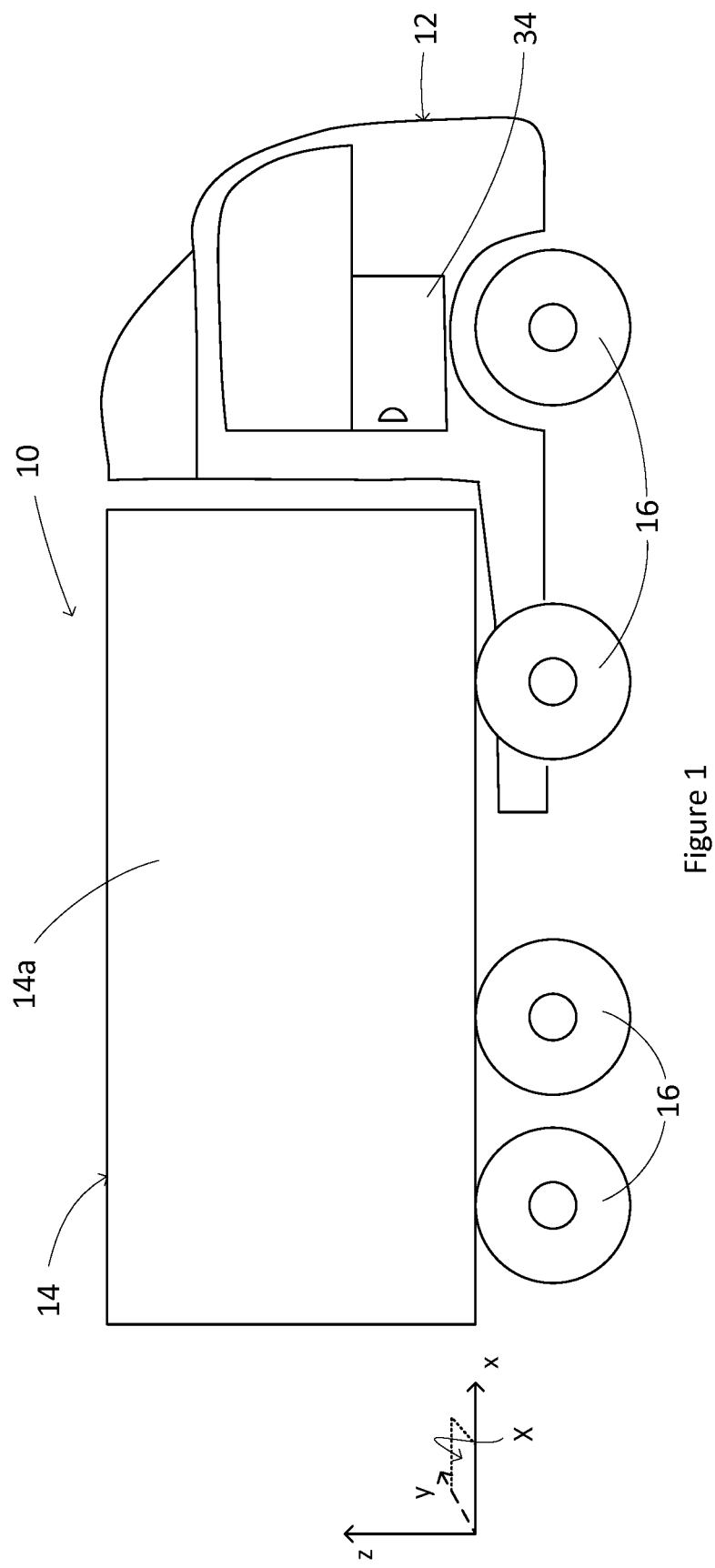

(51) Int. Cl.

| | | |
|---|---|---|
| *B60Q 9/00* | (2006.01) | |
| *B60T 7/12* | (2006.01) | |
| *B60T 8/18* | (2006.01) | |
| *B65G 67/22* | (2006.01) | |
| *G01G 19/10* | (2006.01) | |
| *G01G 19/62* | (2006.01) | |
| *G06Q 10/06* | (2023.01) | |
| *G06Q 50/28* | (2012.01) | |
| *G07C 5/08* | (2006.01) | |
| *B60T 8/1755* | (2006.01) | |
| *B60T 8/171* | (2006.01) | |
| *G06Q 10/0631* | (2023.01) | |
| *G07C 5/00* | (2006.01) | |
| *H04L 67/12* | (2022.01) | |

(52) U.S. Cl.
CPC ............... *B60T 7/12* (2013.01); *B60T 8/171* (2013.01); *B60T 8/1843* (2013.01); *B65G 67/22* (2013.01); *G01G 19/10* (2013.01); *G01G 19/62* (2013.01); *G06Q 10/06315* (2013.01); *G06Q 50/28* (2013.01); *G07C 5/008* (2013.01); *B60T 8/1708* (2013.01); *B60T 8/1887* (2013.01); *B60T 2240/00* (2013.01); *B60T 2250/00* (2013.01); *B60T 2250/03* (2013.01); *H04L 67/12* (2013.01)

(58) Field of Classification Search
CPC ........ G01G 19/10; G01G 19/62; B65G 67/22; B60Q 5/005; B60Q 9/00
See application file for complete search history.

(56) References Cited

U.S. PATENT DOCUMENTS

| | | | |
|---|---|---|---|
| 5,869,943 A | 2/1999 | Nakashima et al. | |
| 6,002,975 A | 12/1999 | Schiffmann et al. | |
| 6,169,946 B1 | 1/2001 | Griessbach | |
| 6,176,555 B1 | 1/2001 | Semsey | |
| 6,253,123 B1 | 6/2001 | Schramm et al. | |
| 6,272,420 B1 | 8/2001 | Schramm et al. | |
| 6,278,930 B1 | 8/2001 | Yamada et al. | |
| 6,304,805 B1 | 10/2001 | Onogi | |
| 6,349,247 B1 | 2/2002 | Schramm et al. | |
| 6,356,188 B1 | 3/2002 | Meyers et al. | |
| 6,366,844 B1 | 4/2002 | Woywod et al. | |
| 6,438,464 B1 | 8/2002 | Woywod et al. | |
| 6,593,849 B2 | 7/2003 | Chubb et al. | |
| 7,040,722 B2 | 5/2006 | Szabo et al. | |
| 7,572,988 B1* | 8/2009 | Morton .................. | G01G 19/10 177/137 |
| 7,850,413 B2* | 12/2010 | Fontana .................... | B66F 3/08 414/331.14 |
| 8,220,710 B2* | 7/2012 | Hoffman .......... | G05B 19/41895 700/214 |
| 8,280,547 B2* | 10/2012 | D'Andrea ............ | G05D 1/0234 700/214 |
| 8,918,202 B2* | 12/2014 | Kawano ............... | G05D 1/0234 700/229 |
| 9,457,970 B1 | 10/2016 | Zevenbergen et al. | |
| 2001/0037677 A1 | 11/2001 | Holst et al. | |
| 2003/0225499 A1 | 12/2003 | Holler | |
| 2004/0019418 A1 | 1/2004 | Lu et al. | |
| 2004/0167701 A1 | 8/2004 | Mattson et al. | |
| 2005/0137767 A1 | 6/2005 | Goebels et al. | |
| 2006/0261937 A1 | 11/2006 | Lu et al. | |
| 2007/0078795 A1 | 4/2007 | Chatte | |
| 2007/0260384 A1 | 11/2007 | Romanchok et al. | |
| 2010/0179844 A1* | 7/2010 | LaFergola ................ | G07C 5/08 715/810 |
| 2012/0143427 A1* | 6/2012 | Hoffman ............ | G05D 1/0274 701/23 |
| 2013/0302132 A1* | 11/2013 | D'Andrea ............ | G05D 1/0297 414/807 |
| 2014/0058556 A1* | 2/2014 | Kawano ............... | G05D 1/0297 701/2 |
| 2016/0052731 A1* | 2/2016 | Berning ............... | G05D 1/0293 299/1.9 |
| 2016/0090248 A1 | 3/2016 | Worsley et al. | |
| 2016/0224930 A1 | 8/2016 | Kadaba et al. | |
| 2016/0236869 A1* | 8/2016 | Kimura ................ | B65G 1/1378 |
| 2016/0375813 A1* | 12/2016 | Colantonio ............. | B60P 1/02 414/495 |
| 2018/0081368 A1* | 3/2018 | Watanabe ............ | G05D 1/0285 |

FOREIGN PATENT DOCUMENTS

| | | |
|---|---|---|
| EP | 1030798 B1 | 5/2002 |
| EP | 1459949 A1 | 9/2004 |
| EP | 1040035 B1 | 3/2007 |
| EP | 1571058 B1 | 8/2007 |
| EP | 2172413 A1 | 4/2010 |
| EP | 2799296 A1 | 11/2014 |
| EP | 2214939 B8 | 4/2016 |
| GB | 2565851 B | 5/2022 |
| GN | 101432172 A | 5/2009 |
| SE | 0950033 A1 | 7/2010 |
| WO | 2002022416 A1 | 3/2002 |
| WO | 2002053427 A1 | 7/2002 |
| WO | 2007078795 A2 | 7/2007 |
| WO | 2008085766 A1 | 7/2008 |
| WO | 2008153757 A1 | 12/2008 |
| WO | 2016054040 A1 | 4/2016 |
| WO | 2016122754 A1 | 8/2016 |
| WO | 2016209965 A1 | 12/2016 |

* cited by examiner

BRAKING SYSTEM

RELATED APPLICATIONS

This application is a National Stage of International Application No. PCT/EP2018/064448, filed Jun. 1, 2018, which claims priority of Great Britain Patent Application No. 1713729.0, filed Aug. 25, 2017, both of which are hereby incorporated by reference in their entireties.

DESCRIPTION OF INVENTION

The invention relates to a vehicle control system in particular for use in maintaining the stability of a combination vehicle comprising a tractor and a trailer or semi-trailer.

It is known to load goods vehicles using loading equipment such as forklift trucks, lifts, cranes or conveyors. Such loading equipment may be fitted with an electronic processor which is connected to sensors which detect the size or weight of the goods or the position in space in which the good are loaded onto the vehicle, the electronic processor having a wireless transmitter by means of which the data detected by the sensors can be transmitted to a wireless signal receiver connected to a separate electronic control unit, for example in a central control/logistics/fleet management office. The loading equipment could be operated by a human or may be autonomous.

It is also known to provide vehicles, in particular commercial goods vehicles comprising a tractor and a trailer or semi-trailer, with a stability control system. Such systems are, for example, described in EP 2 214 939, US 2001/0037677, U.S. Pat. No. 6,176,555, WO0222416, EP 1 571 058, US 2005/0137767, US 2004/019418, US 2004/0167701, US 2006/0261937, US 2003/0225499, DE19522632, EP 1 459 949, EP 1 040 035, WO 02/053427, EP 1 030 798, U.S. Pat. No. 7,040,722, WO 2007/078795, EP 04029629, U.S. Pat. Nos. 6,349,247, 6,304,805, 6,272,420, 6,366,844, 6,278,930, 6,002,975, 5,869,943, 6,169,946, 6,253,123, 6,593,849, 6,356,188, 6,438,464, US 2005/0137767, and EP 0684150.

Typically, such systems use sensors to determine if the vehicle is cornering at such an angle and speed that there is a risk of the vehicle overturning. It is known to use sensors which detect parameters relating to the vehicle dynamics such as the speed of the vehicle, the steering angle, the suspension position, the yaw rate, roll rate or the lateral acceleration of the vehicle, or the speed of the wheels on both sides of the vehicle for this purpose. Once it has been determined that there is a possibility of the vehicle overturning, a control intervention may be carried out, or a further test may be carried out to determine if the risk is sufficiently large that a control intervention is required to reduce this risk. The further test may comprise applying a braking force to the vehicle wheels whilst monitoring the wheel speed. The control intervention may comprise automatic steering control or, more commonly, the application of the vehicle brakes or the use of a retarder to decelerate the vehicle.

It is an object of the present invention to provide an improved vehicle control system.

According to a first aspect of the invention we provide a vehicle control system comprising an electronic processor, the processor comprising an input port for receiving data from a loading apparatus concerning at least one of the weight, dimensions, volume, or location of a load placed or to be placed by the loading equipment into or onto an associated vehicle in which the vehicle control system is fitted, and is programmed to use the data received from the loading apparatus to make control adjustments such that the associated vehicle maintains stability.

The vehicle system may further comprise a sensor which measures a parameter relating to vehicle dynamics and which may be connected to the processor and transmits to the processor data concerning the dynamics of the vehicle, the processor being programmed to use the data received from the sensor, in addition to data from the loading apparatus, to determine if an automatic control intervention is required to alter the vehicle dynamics.

The vehicle control system may be configured to use the data from the loading apparatus for planning a route, concerning at least one of steering angle, vehicle speed, brake torque, or air suspension pressure.

The processor may use the data from the loading apparatus, including predetermined data about the associated vehicle, to estimate location of a centre of gravity and/or a moment of inertia of the vehicle.

The sensor may comprise a steering angle sensor, a lateral acceleration sensor, a yaw rate sensor or a wheel speed sensor.

The processor may additionally comprise an instruction output port for transmitting instructions to the loading apparatus, and may be programmed to use data received from the loading apparatus concerning the weight, dimensions and/or volume of a load to be placed on the vehicle to determine a preferred location in the vehicle for the load, and to transmit to the loading apparatus instructions as to location in or on the vehicle in which the load is to be placed.

The processor may comprise a warning output port and be programmed to use the data received from the loading apparatus to determine if the vehicle is or will be overloaded, and to send a warning signal from the warning output port if the vehicle is or will be overloaded.

The system may include a warning device which is connected to the warning output port and emits an audible or visible warning on receipt of a signal from the warning output port.

The warning output port may comprise a wireless signal transmitter. The input port may comprise a wireless signal receiver.

The instruction output port may comprise a wireless signal transmitter.

The data concerning the location/preferred location of the load in or on the vehicle may comprise coordinates in a plane generally parallel to a wheel base of the vehicle.

The data concerning the location/preferred location of the load in or on the vehicle may comprise coordinates in a plane containing or adjacent to a wheel base of the vehicle, and an indication of the perpendicular distance of the location/preferred location from the said plane.

The automatic control intervention may comprise the application of at least one vehicle brake.

The processor may have a braking output port which is adapted to be connected to the vehicle braking system and be operable to control the vehicle braking system so as to apply a braking force to the vehicle. In this case, the processor may be programmed to control the vehicle braking system to apply a braking force to the vehicle in the event that an automatic control intervention is required.

The system may further include a pressure sensor which, in use, measures the pressure in at least one of a set of bellows an air suspension system provided on the vehicle, and the processor may be connected to the pressure sensor and be programmed to use data received from the pressure sensor to determine a calculated weight of a load in or on the vehicle and to compare the calculated weight with a load weight obtained from the loading apparatus via the input port.

According to a second aspect of the invention we provide a vehicle having a vehicle control system according to the first aspect of the invention.

The vehicle may comprise a truck and trailer or semi-trailer.

The vehicle may be a non-articulated goods vehicle such as a rigid box truck, pick-up truck or van.

According to a third aspect of the invention we provide a method of operating a vehicle control system according to the first aspect of the invention the method comprising receiving data from a loading apparatus concerning at least one of the weight, dimensions, volume, and location of a load placed or to be placed by the loading equipment into or onto a vehicle in which the vehicle control system is fitted, and using the data received from the loading apparatus along with the data received from the sensor in controlling the vehicle dynamics.

In one embodiment, the method includes using the data received from the loading apparatus along with the data received from the sensor when determining if an automatic control intervention is required.

The method may further comprise, prior to the loading equipment placing the load into or onto the vehicle, using data received from the loading apparatus concerning the weight, dimensions and/or volume of the load to determine a preferred location for the load in or on the vehicle and transmitting to the loading apparatus instructions as to the location in or on the vehicle in which the load is to be place.

The method may further comprise using data received from the loading apparatus to determine if the vehicle is or will be overloaded and emitting a warning signal if the vehicle is or will be overloaded.

The method may further comprise applying at least one vehicle brake if an automatic control intervention is required.

The method may further comprise using data received from a pressure sensor which measures the pressure of air in at least one of a set of air suspension bellows on the vehicle to determine a calculated weight of a load in or on the vehicle and to compare the calculated weight with a load weight obtained from the loading apparatus via the input port.

According to a fourth aspect of the invention we provide a vehicle control system comprising an electronic processor, the processor having an input port for receiving data from a loading apparatus concerning at least one of the weight, dimensions, or volume of a load to be placed by the loading equipment into or onto a vehicle in which the vehicle control system is fitted, an instructions output port for transmitting instructions to the loading apparatus, the processor being programmed to use data received from the loading apparatus to determine a preferred location in the vehicle for the load, and to transmit to the loading apparatus instructions as to preferred location in the vehicle in which the load is to be placed.

The vehicle control system may further comprise a sensor which measures a parameter relating to the vehicle dynamics and which is connected to the processor and transmits to the processor data concerning the dynamics of the vehicle, the processor being programmed to use the data received from the sensor in controlling the vehicle dynamics.

In one embodiment, the processor is programmed to use the data received from the sensor to determine if an automatic control intervention is required to alter the vehicle dynamics.

The processor may be programmed to use the data received from the loading apparatus along with the preferred location of the load and the data received from the sensor in controlling the vehicle dynamics.

In one embodiment, the processor is programmed to use the data received from the loading apparatus along with the data received from the sensor when determining if an automatic control intervention is required.

The processor may comprise a warning output port and be programmed to use the data received from the loading equipment, and the preferred location of the load to determine if the vehicle is or will be overloaded, and to send a warning signal from the warning output port if the vehicle is or will be overloaded.

The system may include a warning device which is connected to the warning output port and emits an audible or visible warning on receipt of a signal from the warning output port.

The warning output port may comprise a wireless signal transmitter. The input port may comprise a wireless signal receiver.

The output port may comprise a wireless signal transmitter.

The data concerning preferred location in the vehicle may comprise coordinates in a plane generally parallel to a wheel base of the vehicle.

The data concerning the preferred location in the vehicle may comprise coordinates in a plane containing or adjacent to a wheel base of the vehicle, and an indication of the perpendicular distance of the preferred location from the said plane.

The automatic control intervention may comprise the application of at least one vehicle brake. In this case, the processor may have a brake output port which is adapted to be connected to the vehicle braking system and be programmed to control the vehicle braking system to apply a braking force to the vehicle in the event that an automatic control intervention is required.

The system may further include a pressure sensor which, in use, measures the pressure in at least one of a set of bellows an air suspension system provided on the vehicle, and the processor may be connected to the pressure sensor and be programmed to use data received from the pressure sensor to determine a calculated weight of a load in or on the vehicle and to compare the calculated weight with a load weight obtained from the loading apparatus via the input port.

The sensor may comprise a steering angle sensor lateral acceleration sensor, a yaw rate sensor or a wheel speed sensor.

According to a fifth aspect of the invention we provide a vehicle having a vehicle control system according to the fourth aspect of the invention.

The vehicle may comprise a truck and trailer or semi-trailer.

The vehicle may be a non-articulated goods vehicle such as a rigid box truck, pick-up truck or van.

According to a sixth aspect of the invention we provide a method of operating a vehicle control system according to the fourth aspect of the invention the method comprises using data received from the loading apparatus concerning at least one of the weight, dimensions, or volume of a load to be placed by the loading equipment into or onto a vehicle in which the vehicle control system is fitted to determine a preferred location in the vehicle for the load, and transmitting to the loading apparatus instructions as to preferred location in the vehicle in which the load is to be placed.

The vehicle control system may further comprise a sensor which measures a parameter relating to the vehicle dynamics and which is connected to the processor and transmits to the processor data concerning the dynamics of the vehicle, the method further including the steps of using the data received from the sensor to determine if an automatic control intervention is required to alter the vehicle dynamics.

The method may further include using the data received from the loading apparatus along with the preferred location of the load and the data received from the sensor when determining if an automatic control intervention is required.

The method may further comprise using data received from the loading apparatus to determine if the vehicle is or will be overloaded and emitting a warning signal if the vehicle is or will be overloaded.

The method may further comprise applying at least one vehicle brake if an automatic control intervention is required.

The method may further comprise using data received from a pressure sensor which measures the pressure of air in at least one of a set of air suspension bellows on the vehicle to determine a calculated weight of a load in or on the vehicle and to compare the calculated weight with a load weight obtained from the loading apparatus via the input port.

According to a seventh aspect of the invention we provide a loading apparatus including a load receiving part which is adapted to receive a load, and a drive apparatus which is operable to move the load receiving part to an unloading position in which a load on the load receiving part may be unloaded onto or into a vehicle, a position sensing system which is adapted to determine the position of the load receiving part relative to a vehicle, an electronic processor having an input port which is adapted to receive instructions concerning a preferred location in/on a vehicle onto which a load on the load receiving part is to be placed, the processor being programmed to operate the drive apparatus to move the load receiving part to an unloading position at or adjacent to the said preferred location on receipt of instructions including details of the said preferred location from a processor on the vehicle.

The loading apparatus may further include a weighing apparatus which is operable to measure the weight of a load on the load receiving part, the weighing apparatus being connected to the processor so that the processor receives from the weighing apparatus an indication of the weight of the load on the load receiving part.

The processor may further include an output port and be operable to transmit to the processor on the vehicle an indication of the weight of the load on the load receiving part.

The input port may comprise a wireless signal receiver.

The output port may comprise a wireless signal transmitter.

The loading apparatus may be a forklift truck.

The loading apparatus may comprise a conveyor belt.

The loading apparatus may comprise a lifting apparatus.

According to an eighth aspect of the invention we provide a method of using a loading apparatus according to the seventh aspect of the invention the method comprising receiving instructions from a processor on a vehicle concerning a preferred location in/on the vehicle onto which a load on the load receiving part is to be placed, and operating the drive apparatus to move the load receiving part to an unloading position at or adjacent to the said preferred location.

The method may further include the steps of transmitting to the processor on the vehicle an indication of the weight of the load on the load receiving part.

Figure 2:
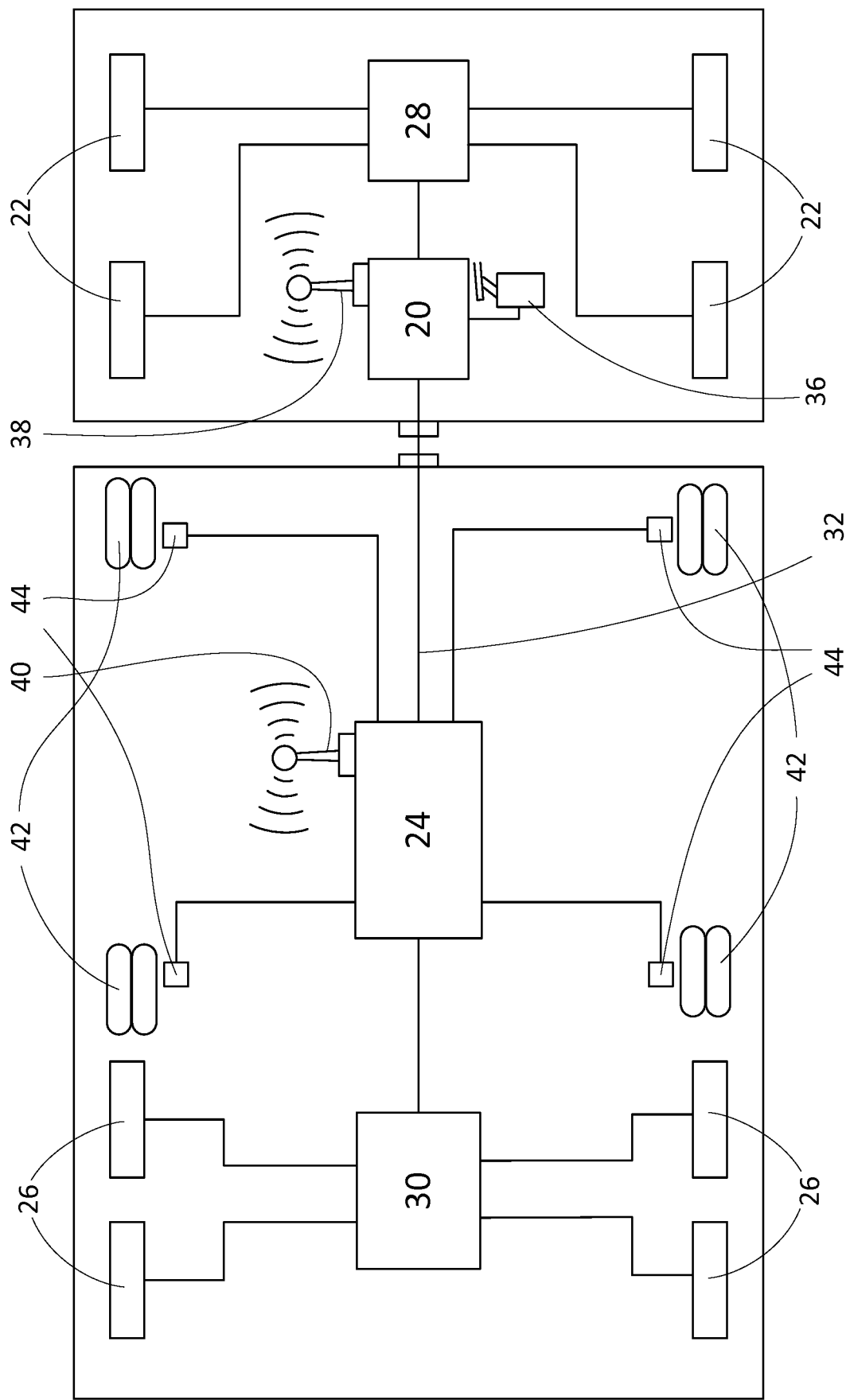
Figure 3:
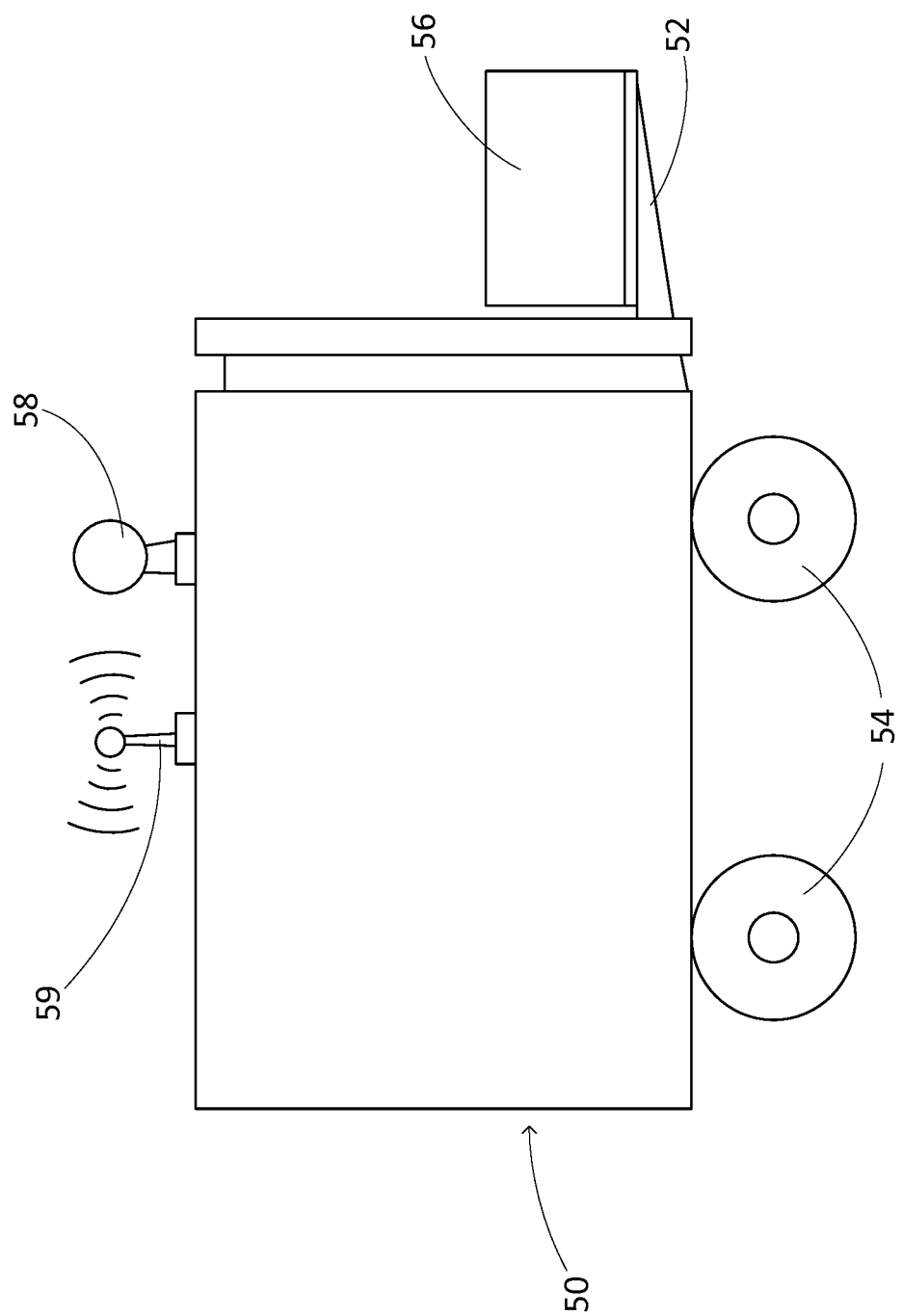

An embodiment of the invention will now be described with reference to the following drawings:

FIG. 1 is a schematic illustration of a vehicle according to the second aspect of the invention, and FIG. 2 is a schematic plan view of the vehicle illustrated in FIG. 1 and a vehicle control system according to the first aspect of the invention, and FIG. 3 is a schematic illustration of a loading apparatus according to the seventh aspect of the invention.

Referring now to FIG. 1, there is shown a vehicle 10 comprising a tractor 12 (hereinafter referred to as the truck 12), and a trailer 14. It will be appreciated, however, that the vehicle could equally comprise a truck and semi-trailer. Moreover, the vehicle need not be articulated—it could be a rigid box truck, van, pick-up truck or other similar goods vehicle.

Each of the truck 12 and trailer 14 are supported on a plurality of ground engaging wheels. In the example illustrated in FIG. 1, both the truck 12 and trailer 14 have two pairs of wheels 16 mounted on two axes. It will be appreciated, however, that the invention could equally be applied to vehicles with a greater or fewer number of wheels and axles.

The trailer has a generally cuboid trailer body 14a, having two generally parallel side walls, a front wall adjacent the truck 12, a rear wall, a roof and a floor, the roof and the floor being generally parallel to the ground.

The vehicle 10 is provided with a braking system 18 which is illustrated schematically in FIG. 2. The braking system 18 comprises a first braking electronic control unit (ECU) 20 which is operable to control the operation of a first set of vehicle brakes 22, a second braking electronic control unit (ECU) 24 which is operable to control the operation of a second set of vehicle brakes 26.

In this example, the vehicles brakes 22, 26 are operated to apply a braking force to the wheels 16 by means of fluid pressure operated actuators, there being an electrically operated valve assembly 28, 30, hereinafter referred to as a modulator, provided to control the flow of pressurised fluid to the brake actuators.

In the embodiment of the invention illustrated in FIG. 2, the first braking ECU 20 and first set of brakes 22 are mounted on the truck 12, and the second braking ECU 24 and second set of brakes 26 are mounted on the trailer 14. Each of the truck 12 and trailer 14 is shown as having a single modulator—a first modulator 28 which is mounted on the truck 12 and a second modulator 30 which is mounted on the trailer 14. It will be appreciated that the invention could equally be applied to other configurations of braking system. For example, the two modulators may be provided on one or both of the truck 12 or trailer 14, one of the two modulators controlling flow of pressurised fluid to the brake actuators associated with the wheels on one of the axles, and the other controlling flow of pressurised fluid to wheels on the other axle.

Alternatively, one of the modulators may control the flow of pressurised fluid to the brake actuators associated with wheels on one side of the vehicle, whilst the other modulator controls the actuators associated with the wheels on the other side of the vehicle. Alternatively, a separate modulator may be provided for the brake actuator associated with each of the wheels.

Typically, the pressurised fluid used to operate the brake actuators is compressed air.

The braking system further comprises a first connection 32 between the first braking ECU 20 and the second braking ECU 24 by means of which an electrical braking control signal may be transmitted between the first and second braking ECUs 20, 24. Typically, the first connection 32 comprises a CAN data bus, but it may comprise any other suitable form of electrical or electronic connection.

Also mounted on the truck 12, typically provided in a driver's cab 34, is a braking demand input device 36 which may be operated to indicate that braking of the vehicle is required. This is typically a foot operated brake pedal. The braking demand input device 36 is connected to the first braking ECU 20, and is configured so that, when operated, it sends a braking demand signal to the first braking ECU 20 indicating the level of braking demanded by the driver. This may be an electrical or electronic braking demand signal, or a fluid pressure braking demand signal. In the latter case, the first braking ECU 20 is provided with a pressure transducer to transform the fluid pressure braking demand signal into an electrical or electronic braking demand signal.

The first braking ECU 20 is programmed to, on receipt of a braking demand signal from the braking demand input device 36, to operate the first set of brakes 22 to apply a level of braking to the truck 12 appropriate to meet the level of braking demanded by the driver. In this embodiment, this is achieved by the first braking ECU 20 sending an electrical control signal to the first modulator 28, which, in turn, controls flow of pressurised fluid to the actuators on the trailer 14.

The first braking ECU 20 is also programmed, on receipt of a braking demand signal from the braking demand input device 36, to send an appropriate electrical braking control signal to the second braking ECU 24 via the first connection 32. The second braking ECU 24 is programmed to, on receipt of such a signal, operate the second set of brakes 26 to apply a level of braking to the trailer appropriate to meet the level of braking demanded by the driver. In this embodiment, this is achieved by the second braking ECU 24 sending an electrical control signal to the second modulator 30, which, in turn, controls flow of pressurised fluid to the actuators on the trailer 14. As mentioned above, it is, of course, possible that more than one modulator may be provided. For example, a first modulator may be provided to control the application of the brakes associated with the wheels 16 on a first side of the trailer 14, and a second modulator provided to control the application of the brakes associated with the wheels on a second side of the trailer 14. The driver may be an automatic control system of an autonomous vehicle.

Typically, the electrical braking control signal merely comprises an indication of the level of braking demanded. The second braking ECU 24 is connected to and receives data from sensors on the trailer. These typically include wheel speed sensors and a load sensor which provides a load signal indicating the degree of loading of the trailer. In this embodiment, the trailer 14 is provided with an air suspension system comprising a set of bellows 42 and associated pressure sensors 44 which each measure the air pressure in the suspension bellows 42. The air pressure in the suspension bellows 42 increases in proportion to any increase in the loading of the trailer 14. These pressure sensors 44 can therefore be used as load sensors providing a load signal indicative of the degree of loading of the trailer 14.

The second braking ECU 24 is typically programmed to use data from at least one of these sensors to determine pressure of fluid required to be supplied to the brake actuators to apply the brakes with sufficient force to achieve the level of braking demanded.

The vehicle is also provided with a vehicle control system which comprises an electronic processor and a sensor which measures a parameter relating to the vehicle dynamics and which is connected to the processor and transmits to the processor data concerning the dynamics of the vehicle. The processor is programmed to use the data received from the sensor to determine if an automatic control intervention is required to alter the vehicle dynamics.

In this embodiment, the vehicle control system is integrated with the vehicle braking system, with the electronic processor of the vehicle control system being the second braking ECU 24—hereinafter referred to as the trailer braking ECU 24, and the automatic control intervention comprises the application of at least one of the vehicle brakes. In this example, the automatic control intervention comprises the application of the trailer brakes, the trailer braking ECU 24 is programmed to apply the brakes automatically, that is in the absence of driver demand for braking, if the vehicle control system determines that a control intervention is required. However, it is equally feasible that the vehicle control system is integrated with the truck and/or trailer braking ECU's independently or in combination.

In this case, the trailer braking ECU 24 is programmed to determine if the vehicle is unstable, or might rollover, based on signals from sensors such as a steering angle sensor, yaw rate sensor, roll rate sensor, lateral acceleration sensor and/or wheel speed sensors. If it is determined that the vehicle is unstable, or might rollover, the trailer braking ECU 24 is programmed to carry out a stability control braking intervention, which comprises the automatic application of at least some of the vehicle brakes even if there is no driver demand for braking. Examples of the ways in which it can be determined that the vehicle is unstable are disclosed in EP 2 214 939, US 2001/0037677, U.S. Pat. No. 6,176,555, WO0222416, EP 1 571 058, US 2005/0137767, US 2004/019418, US 2004/0167701, US 2006/0261937, US 2003/0225499, DE19522632, EP 1 459 949, EP 1 040 035, WO 02/053427, EP 1 030 798, U.S. Pat. No. 7,040,722, WO 2007/078795, EP04029629, U.S. Pat. Nos. 6,349,247, 6,304,805, 6,272,420, 6,366,844, 6,278,930, 6,002,975, 5,869,943, 6,169,946, 6,253,123, 6,593,849, 6,356,188, 6,438,464, US2005/0137767, and EP0684150.

All the features of the braking system 18 mentioned above are currently standard in the braking systems of goods vehicles, and as such, are well known to those of skill in the art.

The inventive system differs from the prior art systems in that the trailer braking ECU 24 further comprises an input port for receiving data from a loading apparatus, the data concerning at least one of the weight, dimensions, volume, and location of a load placed or to be placed by the loading equipment into or onto the vehicle 10, and is programmed to use the data received from the loading apparatus along with the data received from the or each sensor referred to above when determining if an automatic control intervention is required.

In the case of a truck and trailer combination, the trailer may be loaded without being connected to the truck, so the information needs to be shared with the truck ECU once connected, and vice versa. The trailer has its weight distribution and the truck has a separate weight distribution. Both these weight distributions need to be combined with weight data from the loading apparatus, in order to estimate the full vehicle centre of gravity and/or moment of inertia.

In a preferred embodiment, the input port comprises a wireless signal receiver 40. It will be appreciated, however, that it could equally be a port adapted for receiving a wired connection to the loading apparatus.

The data concerning the location/preferred location of the load in the vehicle may simply comprise x & y coordinates in a reference plane generally parallel to a wheel base of the vehicle 10, the wheel base of the vehicle being a plane in which the axes of the wheels 16 of the vehicle 10 lie. In FIG. 1, the x and z axes extend in the plane of the drawing, whereas the y axis extends perpendicularly into the drawing. In a preferred embodiment, however, the data comprises x, y & z coordinates the x & y coordinates indicating the position in a reference plane containing or adjacent and generally parallel to the wheel base of the vehicle, and the z coordinate indicating the perpendicular distance of the location/preferred location from the said plane X. An example of a suitable reference plane adjacent and generally parallel to the wheel base of the vehicle 10 is marked X (and comprising the x and y axes) in FIG. 1. In this case, the reference plane coincides with the floor of the trailer body 14*a*. Expressed in a different way, the x and y coordinates indicate the position in the bottom plane of the trailer compartment as seen from above, and the z coordinate indicate the height from the bottom plane of said compartment.

In a relatively simple system, the trailer braking ECU 24 may use the signal from a lateral acceleration sensor or yaw rate sensor to detect that the vehicle 10 is turning, and initiate a braking control intervention if the lateral acceleration or yaw rate of the vehicle exceeds a threshold level. Alternatively, the system may use signals from the wheel speed sensors associated with wheels on both sides of the vehicle 10, or a signal from a steering angle sensor and vehicle speed sensor to calculate the lateral acceleration or yaw rate of the vehicle 10. In a preferred embodiment, the vehicle state is calculated using signals from a steering wheel sensor, wheel speed sensors and a lateral acceleration or yaw rate sensor. More advanced systems would calculate the vehicle state by using all the above-mentioned sensors, i.e. steering wheel sensor, wheel speed sensor and accelerometer(s).

In either case, the threshold level of the lateral acceleration or yaw rate could be set according to the data received from the loading apparatus. For example, the threshold level could be inversely proportional to the weight of the load placed in or on the trailer 14 by the loading apparatus, so that the heavier the load, the lower the threshold level of lateral acceleration or yaw rate for triggering a control intervention.

In a more complex stability control system, a further stability test is carried out if the lateral acceleration or yaw rate exceeds the threshold level, and it is the outcome of the further stability test that determines if a control intervention is required. The further stability test may involve the application of a test braking pulse to at least some of the wheels 16.

For example, the system described in EP 2 214 939 may be used where the trailer 14 is provided with two modulators—a first modulator controlling the application of the brakes associated with the wheels 16 on a first side of the trailer 14, and a second modulator controlling the application of the brakes associated with the wheels on a second side of the trailer 14. In this case, the trailer braking ECU 24 is programmed such that when the lateral acceleration of the vehicle exceeds a predetermined value, it uses the lateral acceleration input to determine which way the vehicle is turning, and deactivates the ABS control of the wheels 16 on the inside of the vehicle's turning curve such that the wheel speed of each of the inside wheels 16 is not taken into consideration when determining whether an ABS intervention is required, i.e. the ABS system operates in "Select High" mode, and if it is determined that ABS control is required, the braking pressure to the outside wheels only is modified accordingly. The trailer braking ECU 24 also sends a braking signal to the modulator 30 providing a pneumatic braking signal to the brake actuators 26 associated with these wheels 16 so as to apply a low level test braking pulse to each of the inside wheels 16, and uses the wheel speed sensors to monitor the speed of each of the inside wheels 16. Normal ABS control is resumed after the test pulse has been applied.

The magnitude of the braking force applied to each of the inside wheels 16 is such that with full or substantially full adhesion between the wheels 16 and the road, the braking force would have little impact on the wheel speed. If, however, adhesion between any of the inside wheels 16 and the road is reduced because the inside wheels 16 are tending to lift off the road, the test braking force is sufficiently high to cause the wheel in question to stop or slow down until there is a high level of slip between the road and the wheel. It has been found that the application of the test braking pulse to a non-lifting wheel can cause an initial rapid deceleration of the wheel, but this initial deceleration is short lived, and does not result in any significant degree of wheel slip. As such, the system is configured such that the deceleration of the wheel is not taken into consideration when assessing whether a stability control intervention is required, and, if the trailer braking ECU 24 detects that the slip between the road and any of any of the inside wheels 16 exceeds a predetermined amount following application of the test braking pulse, this is taken as an indication that lift of the inside wheels 16 is occurring and that there is a possibility that vehicle rollover may occur.

In this embodiment of the invention, if wheel lift is detected, the trailer braking ECU 24 is programmed to initiate a stability control braking intervention, and send a braking signal to the modulator 30, providing a pneumatic braking signal to the brake actuators 26 associated with the outside, non-lifting wheels 16 so as to slow the vehicle down, and hence reduce the likelihood of rollover. It will be appreciated, however, that the control intervention could comprise other means of reducing the vehicle speed, such as throttling the vehicle engine. Alternatively or additionally, if wheel lift is detected, the trailer braking ECU 24 may be programmed to generate a rollover alarm signal, which may comprises an audible or visual alarm or both, to alert the driver that braking is required to reduce the vehicle speed, and hence avoid rollover.

When the present invention is applied to this system, the lateral acceleration threshold which triggers the test braking process could be altered depending on the data received from the loading apparatus. For example, the threshold level could be inversely proportional to the weight of the load placed in or on the trailer 14 by the loading apparatus, so that the heavier the load, the lower the threshold level of lateral acceleration for triggering the test braking process. Additionally or alternatively, the amount of slip between the road and the wheels on the inside of the turn which triggers a stability control intervention could be set according to the data received from the loading apparatus. For example, the heavier the load, the lower the level of detected slip which will trigger a stability control intervention. Alternatively or additionally, the higher the load in the vehicle, represented by the z coordinate mentioned above, the lower the level of detected slip which will trigger a stability control intervention.

The weight distribution in the plane of the floor of the load on the floor of the trailer 14 is also important when assessing the stability of the vehicle 10. For example, if the load is located towards the right hand side of the trailer 14, the vehicle 10 is more likely to rollover when the vehicle 10 corners to the left. Conversely, if the load is located towards the left hand side of the trailer 14, the vehicle 10 is more likely to rollover when the vehicle corners to the right.

Thus, the trailer braking ECU 24 may be programmed to take into consideration the data concerning the location/preferred location of the load in the reference plane—i.e. the x and y coordinates mentioned above, when determining if a stability control intervention is required. For example, it may be programmed to reduce the slip threshold at which a control intervention is initiated when the vehicle is cornering to the left when it determines, based on the data provided by the loading apparatus, that the load is located at its right hand side, or to reduce the threshold at which a control intervention is initiated when the vehicle is cornering to the right when it determines, based on the data provided by the loading apparatus, that the load is located at its left hand side.

In other words, the data from the loading apparatus, in the form of load x, y, z, will determine if the slip limits will increase or decrease. The calculation of centre of gravity and/or moment of inertia will be used to determine the thresholds that are used by the automatic intervention system, or as input for making proactive choices as to speed, braking torque, suspension settings and/or steering angle, in order to ensure safe and stable operation. The additional data from the loading apparatus will hence improve the control prerequisites in addition to the steering wheel sensor, wheel speed sensor and accelerometer.

In a preferred embodiment, the processor, (so in this case the trailer braking ECU 24) has a memory, and is programmed to store in the memory the data received from the loading apparatus, at least until the load in question is unloaded from the vehicle. This can be determined by a signal from the loading apparatus, and/or by checking the air pressure in the air suspension bellows. For example, the processor could be notified that the vehicle 10 has been unloaded (and thus prompted to erase the said data from its memory) by the manual input of a reset signal by an operator, or by the loading apparatus used to unload the vehicle 10 transmitting an appropriate "unload notification signal" to the processor.

In this case, the trailer braking ECU 24 may be programmed to use the stored information concerning the weight and location of each load in or on the trailer, together with pre-programmed trailer specific information concerning the dimensions and weight distribution of the trailer itself to calculate the centre of gravity of the trailer 14, and to use this and the input signal from the lateral acceleration sensor or yaw rate sensor to calculate if the centre of gravity of the trailer 14 is sufficiently high that it is likely to move outside of the wheel base of the trailer 14 during cornering, thus causing rollover, and initiate a control intervention on the basis of this determination. It will be appreciated that both the weight of the load, and its location (both in the reference plane and its distance from the reference plane, as defined by the x, y and z coordinates described above would be used in determining the centre of gravity of the trailer 14.

As mentioned above in relation to conventional prior art systems, during braking—either driver demanded or braking demanded by an automatic system in a stability control intervention, the trailer braking ECU 24 uses an input from a load sensor in determining the level of braking force to be applied to the trailer brakes in order to meet the demanded level of braking. Whilst this is conventionally done using the signal from a pressure sensor which measures the pressure of the fluid in the bellows of the air suspension, in the inventive system, the trailer braking ECU 24 may use the stored data from the loading apparatus concerning the weight of the loads placed in or on the trailer 14 in place of the signal from the air bellows pressure sensor. In this case, the distribution of the load across the trailer could be taken into consideration, and the trailer braking ECU 24 programmed to control the brake actuators 26 in an optimal way. This could be to apply a greater braking force to the wheels which are more heavily loaded, and a lower braking force to the wheels which are less heavily loaded. For example, the brake force may be calculated based on the vehicle state detection and adjusted based on available mu levels by detecting slip levels during controls. By using the additional load data received from the loading apparatus, determining the optimal or closer to optimal usage of the available mu level per wheel is feasible, as the dynamics of the weight distribution between the wheels can be calculated.

It is foreseen, in the inventive system, that the brake force is calculated based on the vehicle state detection and is adjusted based on the available mue levels (tire-road friction), by detecting slip levels during controls. By using the additional data provided by the loading apparatus, the optimal usage of the available mue level per wheel is feasible as the dynamics of the weight distribution between the wheels can be calculated.

In this embodiment, the trailer braking ECU 24 additionally comprises an instruction output port for transmitting instructions to the loading apparatus, and is programmed to use data received from the loading apparatus concerning the weight, dimensions and/or volume of a load to be placed on the vehicle 10 to determine a preferred location in the vehicle 10 for the load, and to transmit to the loading apparatus instructions as to location in or on the vehicle 10 in which the load is to be placed.

In a preferred embodiment, the instruction output port comprises a wireless signal transmitter 40. It will be appreciated, however, that it could equally be a port adapted for a wired connection to the loading apparatus.

It will be appreciated that the higher the centre of gravity of the vehicle 10, the less stable the vehicle 10 is, and the centre of gravity of the vehicle 10 is raised if heavier loads are placed high up in the trailer. For example, if the trailer is a double deck trailer, i.e. has a lowermost floor, a ceiling and an intermediate floor between the lowermost floor and the ceiling, the centre of gravity of the vehicle 10 will be raised if heavy loads are placed on the intermediate floor and lighter loads on the lowermost floor. As such, it is desirable to place heavy loads as low down in the trailer 14 as possible in order to maximise the stability of the vehicle 10.

In one embodiment of the invention, therefore, where fitted to a vehicle 10 with a double deck trailer 14, the trailer braking ECU 24 is programmed to transmit instructions to the loading apparatus that the load is to be placed on the lowermost floor if the weight of the load exceeds a predetermined value, and to transmit instructions to the loading apparatus that the load is to be placed on the intermediate floor if the weight of the load is below the predetermined value.

Where the trailer braking ECU 24 has such a memory, the trailer braking ECU 24 is advantageously programmed to take into account the stored data about the location and weight, size etc. of the loads already loaded into/onto the vehicle 10 when issuing instructions to the loading apparatus as to the preferred location of the next load.

For example, the trailer braking ECU 24 is advantageously programmed to determine, based on data received from the loading apparatus concerning the volume or dimensions of the load currently being held by the loading apparatus, and based on the stored data concerning the volume or dimensions of the loads already placed in the trailer 14, if there is any room for this load in the trailer 14.

Moreover, for a double deck trailer, when preparing to accept a load which is heavier than the predetermined threshold weight mentioned above, the trailer braking ECU 24 is advantageously programmed to determine, based on data received from the loading apparatus concerning the volume or dimensions of the load currently held by the loading apparatus and the stored data concerning the volume or dimensions of the loads already placed on the lowermost floor of the trailer 14, if there is any room for the next load on the lowermost floor of the trailer 14.

The weight distribution in the plane of the floor of the loads on the floor or floors of the trailer 14 is also important when assessing the stability of the vehicle 10. For example, if the heaviest loads are all located towards the right hand side of the trailer 14, the vehicle 10 is more likely to rollover when the vehicle 10 corners to the left. Conversely, if the heaviest loads are all located towards the left hand side of the trailer 14, the vehicle 10 is more likely to rollover when the vehicle corners to the right.

Thus, the trailer braking ECU 24 may be programmed to take into consideration the data concerning the location/preferred location of the load or loads in the reference plane—i.e. the x and y coordinates mentioned above, when determining if a stability control intervention is required. For example, it may be programmed to reduce the threshold at which a control intervention is initiated when the vehicle is cornering to the left when it determines, based on the data provided by the loading apparatus, that it is more heavily laden at its right hand side, or to reduce the threshold at which a control intervention is initiated when the vehicle is cornering to the right when it determines, based on the data provided by the loading apparatus, that it is more heavily laden at its left hand side.

Moreover, where the trailer braking ECU 24 sends instructions to the loading apparatus as to the preferred location of the load, the trailer braking ECU 24 is advantageously programmed to attempt to balance, as far as possible, the weight of the loads across the trailer 14 from one side of the trailer 14 to the other.

In one embodiment, the trailer braking ECU 24 is provided with a warning output port and is programmed to use the data received from the loading apparatus, along with any stored data concerning the weight of loads already placed in the trailer 14, to determine if the vehicle 10 is or will be overloaded, and to send a warning signal from the warning output port if the vehicle 14 is or will be overloaded. In this case, the system includes a warning device which is connected to the warning output port and emits an audible or visible warning on receipt of a signal from the warning output port. The warning device could comprise a bell, buzzer or siren, a visual display unit or simply a light or LED on a dashboard in the driver's cab 34.

The warning output port may comprise a wireless signal transmitter, and therefore be wirelessly connected to the warning device.

In this embodiment of the invention, the trailer braking ECU 24 receives load signals from pressure sensors 44 which measure the pressure of the air in the suspension bellows. The trailer braking ECU 24 is therefore programmed to use data received from the pressure sensors 44 to determine a calculated weight of a load in or on the trailer 14 and to compare the calculated weight with a load weight obtained from the loading apparatus via the input port 40, or the total weight of the loads placed on or in the trailer 14 as stored in the memory of the trailer braking ECU 24, to verify that the data received from the loading apparatus is accurate.

The trailer braking ECU 24 may also be programmed to use the signals from the pressure sensors 44 to detect when the trailer 14 has been unloaded, and to erase the load data stored in its memory when these indicate that the trailer 14 has been unloaded.

Whilst in this embodiment of the invention, the system is provided with a sensor which measures a parameter relating to the vehicle dynamics and which is connected to the processor and transmits to the processor data concerning the dynamics of the vehicle, the processor being programmed to use the data received from the sensor to determine if an automatic control intervention is required to alter the vehicle dynamics, this need not be the case.

For example, the invention may be applied to an autonomous vehicle, i.e. one which is driven by a computer, rather than by a human being. In this case, rather than being used to intervene to correct the poor or unsafe driving of a human being, the data received from the loading apparatus can be used to set how the vehicle is driven in the first place, in determining the speed and path of the vehicle, in particular when negotiating curves. For example, the processor may be programmed to use the data received from the loading apparatus to determine the centre of gravity and/or the moment of inertia of the vehicle, and to combine this with data concerning the road ahead to calculate an appropriate speed for the vehicle to travel around a corner without there being any significant risk of rollover.

Alternatively, the trailer braking ECU 24 may simply be programmed to use data received from the loading apparatus to determine a preferred location in the vehicle 10 for the load, and to transmit to the loading apparatus instructions as to preferred location in the vehicle 10 in which the load is to be placed as described above.

Alternatively or additionally, the trailer braking ECU 24 may simply be programmed to, when there is demand for braking, use the data received from the loading apparatus when determining what braking force is required to be applied by the brakes 26 to the wheels 16 of the vehicle 10 to meet demand for braking, as described above.

It will be appreciated that the above description relates to one embodiment of the invention only. The invention is defined as set out in the appended claims and modifications may be made within the scope these claims. For example, the processor of the claimed vehicle control system need not be the trailer braking ECU—it may be the first braking ECU 20 (i.e. the truck ECU), or where the system is employed on a non-articulated vehicle, i.e. a rigid vehicle such as a box truck, van or pick-up truck, with a single braking ECU, it may be the single braking ECU.

Where the trailer braking ECU 24 is used, it will be appreciated that it is advantageously be configured to operate to collect data from the loading apparatus as described above even whilst the trailer 14 is not connected to a truck 12. In this case, the trailer braking ECU 24 could be programmed to transmit the collected data to the truck ECU 20 once the two are coupled, so that the truck ECU 20 can then carry out the further processing of the received data. It will be appreciated, therefore, that the processor of the claimed invention could comprise both the truck ECU 20 and the trailer braking ECU 24.

Equally, the processor of the claimed vehicle control system need not be a braking ECU—it may be a dedicated, separate processor, or an ECU used in the control of some other aspect of the vehicle dynamics such as the engine speed or torque, the application of a retarder, the steering angle or the vehicle suspension.

Whilst the invention is described in relation to a system in which the control intervention involves the application of the vehicle brakes, this need not be the case, and some other mode of operation of the vehicle could be controlled to preserve or restore the stability of the vehicle. For example, the control intervention could comprise applying the brakes, applying an engine retarder, controlling the speed of operation of the engine or the engine torque, altering the steering angle, or controlling the vehicle suspension, or, indeed a combination of two or more of these.

Finally, it will be appreciated that, whilst the invention has been described in relation to a pneumatic braking system, the braking system could equally be hydraulically or purely electrically operated.

Referring now to FIG. 3, there is shown a loading apparatus 50 according to another aspect of the invention. In this example, the loading apparatus is a forklift truck, which has a loading receiving part 52 comprising a pair of elongate arms, known as the forks. It should be appreciated, however, that it could equally be a crane, lift, conveyor, drone or any other similar loading apparatus comprising a load receiving part 52 which is adapted to receive a load 56, and a drive apparatus which is operable to move the load receiving part to an unloading position in which a load 56 on the load receiving part may be unloaded onto or into the vehicle 10.

The fork lift truck 50 further includes a position sensing system 58 which is adapted to determine the position of the load receiving part relative to a designated feature which could be the vehicle 10. Forklift trucks having such a position sensing system are well known, and are known as automatic guided vehicles or AGVs. It is known for such AGVs to move around a goods storage facility, collecting goods from a designated pick-up point and delivering the goods to a designated drop-off point (either another point in the storage facility, onto another piece of goods handling equipment such as a conveyor or onto another vehicle such as a lorry), entirely under computer control, and without human intervention. These typically use a laser-based guidance system, but it is more preferable for the truck 50 to use digital cameras mounted thereon, along with appropriate object recognition software, to determine its location.

The fork lift truck 50 also has an electronic processor having an input port 59 which is adapted to receive instructions concerning a preferred location in/on the vehicle 10 onto which a load 56 on the load receiving part is to be placed.

In a preferred embodiment of the invention, the input port comprises a wireless signal receiver, but it will be appreciated that it could equally be a port for a hard wired connection.

The processor is programmed to operate the drive apparatus to move the load receiving part to an unloading position at or adjacent to the said preferred location on receipt of instructions including details of the said preferred location from a processor on the vehicle 10. In this embodiment of the invention, the drive apparatus comprises a motor which drives wheels 54 of the forklift truck 50 to move the forklift truck 50 from one place to another, and a further motor or other actuator which raises or lowers the loading receiving part 52 (the "forks").

The fork lift truck 50 may further include a weighing apparatus which is operable to measure the weight of a load on the load receiving part, the weighing apparatus being connected to the processor so that the processor receives from the weighing apparatus an indication of the weight of the load on the load receiving part. The weighing apparatus may comprise electronic strain gauges which measure the strain exerted by a load 56 on the forks 52 or a pressure sensor which measures the fluid pressure in a suspension system on the forklift truck 50. Alternatively, or additionally, the processor on the forklift truck 50 may comprise a reader for reading data from an electronic tag or other coded label provided on the load (such as an RFID tag or bar code), which data may include the weight, dimensions and/or volume of the load.

In this embodiment, the processor further includes an output port and is operable to transmit to the processor on the vehicle 10 an indication of the weight, dimensions and/or volume of the load on the load receiving part 52.

In a preferred embodiment of the invention, the output port comprises a wireless signal transmitter. It will be appreciated, however, that it might comprise a port for a hard wired connection.

It is foreseen that a logistics warehouse can communicate directly or indirectly, via a loading apparatus, with a vehicle to be loaded. Through such communication, the warehouse can share load data with the vehicle, in order to optimize the load profile of the vehicle with respect to centre of gravity and/or moment of inertia. This optimization may also consider an already planned route, as to road conditions, traffic information, mue characteristics (potentially from other vehicles that have recently travelled the same route) etc. Road condition data can comprise information about turn radius, road inclination, speed limits, surface condition, and surface type. It would hence be possible to consider the optimal load of the vehicle, based on pre-existing information about the route, through intercommunication between the vehicle and the logistics warehouse. The load is then placed inside the vehicle by a loading apparatus, having means for accurately placing the individual load objects inside the cargo compartment. The intercommunication between the logistics warehouse and the vehicle may also be limited to only achieving optimal loading, irrespective of the route. Optimal loading can be determined by location of centre of gravity, maximum loading, moment of inertia and/or accessibility, if different unloading stops are planned.

When used in this specification and claims, the terms "comprises" and "comprising" and variations thereof mean that the specified features, steps or integers are included. The terms are not to be interpreted to exclude the presence of other features, steps or components. The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A vehicle control system comprising:
an electronic processor, the processor comprising an input port for receiving data from a loading apparatus concerning at least one of a weight, dimensions, volume, or location of a load placed or to be placed by the loading apparatus into or onto an associated vehicle in which the vehicle control system is fitted, and is programmed to use the data received from the loading apparatus to make control adjustments such that the associated vehicle maintains stability; and
a sensor which measures a parameter relating to vehicle dynamics and which is connected to the processor and transmits to the processor data concerning the vehicle dynamics,
wherein the electronic processor is further programmed to use the data received from the sensor, in addition to data from the loading apparatus, to determine if an automatic control intervention is required to alter vehicle dynamics.

2. A vehicle control system according to claim 1 wherein the sensor comprises a steering angle sensor, a lateral acceleration sensor, a yaw rate sensor or a wheel speed sensor.

3. A vehicle control system according to claim 1, which is configured to use the data from the loading apparatus for planning a route, concerning at least one of steering angle, vehicle speed, brake torque, or air suspension pressure.

4. A vehicle control system according to claim 1, in which the processor uses the data from the loading apparatus, including predetermined data about the associated vehicle, to estimate location of a centre of gravity and/or a moment of inertia of the vehicle.

5. A vehicle control system according to claim 1 wherein the input port comprises a wireless signal receiver.

6. A vehicle control system according to claim 1 wherein the processor additionally comprises an instruction output port for transmitting instructions to the loading apparatus, and is programmed to use data received from the loading apparatus concerning the weight, dimensions and/or volume of a load to be placed on the vehicle to determine a preferred location in the vehicle for the load, and to transmit to the loading apparatus instructions as to the preferred location.

7. A vehicle control system according to claim 6 wherein the instructions concerning the preferred location comprises coordinates in a plane generally parallel to a wheel base of the vehicle.

8. A vehicle control system according to claim 6 wherein the instructions concerning the preferred location comprises coordinates in a plane containing or adjacent to a wheel base of the vehicle, and an indication of a perpendicular distance of the location from the said plane.

9. A vehicle control system according to claim 6 wherein the instruction output port comprises a wireless signal transmitter.

10. A vehicle control system according to claim 1 wherein the processor comprises a warning output port and is programmed to use the data received from the loading apparatus to determine if the vehicle is or will be overloaded, and to send a warning signal from the warning output port if the vehicle is or will be overloaded.

11. A vehicle control system according to claim 10 wherein the system further includes a warning device which is connected to the warning output port and emits an audible or visible warning on receipt of a signal from the warning output port.

12. A vehicle control system according to claim 10 wherein the warning output port comprises a wireless signal transmitter.

13. A vehicle control system according to claim 1 wherein the processor has a braking output port which is adapted to be connected to a vehicle braking system and is operable to control the vehicle braking system so as to apply a braking force to the vehicle.

14. A vehicle braking system according to claim 13 wherein the processor is programmed to control the vehicle braking system to apply a braking force to the vehicle in an event that the automatic control intervention is required.

15. A vehicle braking system according to claim 13, the vehicle braking system further including a pressure sensor which, in use, measures the pressure in at least one of a set of bellows an air suspension system provided on the vehicle, and the processor is connected to the pressure sensor and is programmed to use data received from the pressure sensor to determine a calculated weight of a load in or on the vehicle and to compare the calculated weight with a load weight obtained from the loading apparatus via the input port.

16. A method of operating a vehicle control system according to claim 1, the method comprising receiving data from a loading apparatus concerning at least one of the weight, dimensions, volume, and location of a load placed or to be placed by the loading apparatus into or onto a vehicle in which the vehicle control system is fitted, and using the data received from the loading apparatus along with the data received from the sensor in controlling vehicle dynamics.

17. A method according to claim 16 further comprising, prior to the loading apparatus placing the load into or onto the vehicle, using data received from the loading apparatus concerning the weight, dimensions and/or volume of the load to determine a preferred location for the load in or on the vehicle and transmitting to the loading apparatus instructions as to the preferred location.

18. A method of claim 16 further comprising using data received from the loading apparatus to determine if the vehicle is or will be overloaded and emitting a warning signal if the vehicle is or will be overloaded.

19. A method of claim 16 further comprising applying at least one vehicle brake if the automatic control intervention is required.

20. A method of claim 16 further comprising using data received from a pressure sensor which measures air pressure in at least one of a set of air suspension bellows on the vehicle to determine a calculated weight of a load in or on the vehicle and to compare the calculated weight with a load weight obtained from the loading apparatus via the input port.

21. The vehicle control system according to claim 1, wherein the automatic control intervention comprises the application of at least one vehicle brake.

22. A vehicle control system comprising an electronic processor, the processor having an input port for receiving data from a loading apparatus concerning at least one of a weight, dimensions, or volume of a load to be placed by the loading apparatus into or onto a vehicle in which the vehicle control system is fitted, an instructions output port for transmitting instructions to the loading apparatus, the processor being programmed to use data received from the loading apparatus to determine a preferred location in the vehicle for the load, and to transmit to the loading apparatus instructions as to the preferred location, wherein the instructions concerning the preferred location comprises coordinates in a plane generally parallel to one or both of a wheel base of the vehicle and a base of a trailer of the vehicle.

23. A vehicle control system according to claim 22 further comprising a sensor which measures a parameter relating to vehicle dynamics and which is connected to the processor and transmits to the processor data concerning the vehicle dynamics, the processor being programmed to use the data received from the sensor to control the vehicle dynamics.

24. A vehicle control system according to claim 23 wherein the processor is programmed to use the data received from the sensor to determine if an automatic control intervention is required to alter the vehicle dynamics.

25. A vehicle control system according to claim 23 wherein the processor is programmed to use the data received from the loading apparatus along with the preferred location and the data received from the sensor to control the vehicle dynamics.

26. A vehicle control system according to claim 25 wherein the processor is programmed to use the data received from the loading apparatus along with the preferred location and the data received from the sensor when determining if an automatic control intervention is required.

27. A vehicle control system according to claim 26 wherein the automatic control intervention comprises the application of at least one vehicle brake.

28. A vehicle control system according to claim 23 wherein the processor has a brake output port which is adapted to be connected to a vehicle braking system and is operable to control the vehicle braking system to apply a braking force to the vehicle.

29. A vehicle control system according to claim 28 wherein the processor is programmed to control the vehicle braking system to apply a braking force to the vehicle in the event that an automatic control intervention is required.

30. A vehicle control system according to claim 22 wherein the processor comprises a warning output port and is programmed to use the data received from the loading apparatus, and the preferred location to determine if the vehicle is or will be overloaded, and to send a warning signal from the warning output port if the vehicle is or will be overloaded.

31. A vehicle control system according to claim 30 wherein the system includes a warning device which is connected to the warning output port and emits an audible or visible warning on receipt of a signal from the warning output port.

32. A vehicle control system according to claim 30 wherein the warning output port comprises a wireless signal transmitter.

33. A vehicle control system according to claim 22 wherein the input port or the instructions output port comprises a wireless signal receiver.

34. A vehicle control system according to claim 22 wherein the instructions concerning the preferred location comprises coordinates in a plane containing or adjacent to a wheel base of the vehicle, and an indication of a perpendicular distance of the preferred location from the said plane.

35. A vehicle control system according to claim 22 wherein the system further includes a pressure sensor which, in use, measures the pressure in at least one of a set of bellows an air suspension system provided on the vehicle, and the processor is connected to the pressure sensor and programmed to use data received from the pressure sensor to determine a calculated weight of a load in or on the vehicle and to compare the calculated weight with a load weight obtained from the loading apparatus via the input port.

36. A method of operating a vehicle control system according to claim 22, the method comprises using data received from the loading apparatus concerning at least one of the weight, dimensions, or volume of a load to be placed by the loading apparatus into or onto a vehicle in which the vehicle control system is fitted to determine the preferred location, and transmitting to the loading apparatus instructions as to the preferred location.

37. A method of claim 36 wherein the vehicle control system further comprising a sensor which measures a parameter relating to vehicle dynamics and which is connected to the processor and transmits to the processor data concerning the vehicle dynamics, the method further including the steps of using the data received from the sensor to determine if an automatic control intervention is required to alter the vehicle dynamics.

38. A method of claim 37 further including using the data received from the loading apparatus along with the preferred location and the data received from the sensor when determining if the automatic control intervention is required.

39. A method of claim 37 further comprising applying at least one vehicle brake if the automatic control intervention is required.

40. A method of claim 36 further comprising using data received from the loading apparatus to determine if the vehicle is or will be overloaded and emitting a warning signal if the vehicle is or will be overloaded.

41. A method according to claims 36, the method further comprising using data received from a pressure sensor which measures air pressure in at least one of a set of air suspension bellows on the vehicle to determine a calculated weight of a load in or on the vehicle and to compare the calculated weight with a load weight obtained from the loading apparatus via the input port.

* * * * *